(12) United States Patent
Hasegawa et al.

(10) Patent No.: US 6,414,741 B2
(45) Date of Patent: Jul. 2, 2002

(54) METHOD OF MANUFACTURING FLAT-PANEL DISPLAY DEVICE

(75) Inventors: Tatsuya Hasegawa; Takao Horita; Yoshikazu Yomogihara, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/851,428

(22) Filed: May 9, 2001

(30) Foreign Application Priority Data

May 10, 2000 (JP) ........................ 2000-137368
May 16, 2000 (JP) ........................ 2000-143549

(51) Int. Cl.⁷ .................... G02F 1/13; G02F 1/1395
(52) U.S. Cl. .................... 349/187; 349/149
(58) Field of Search ................. 349/187, 188, 349/190, 122, 149, 150, 152

(56) References Cited

U.S. PATENT DOCUMENTS 5,943,113 A * 8/1999 Ichihashi .................. 349/126
6,215,540 B1 * 4/2001 Stephenson ................ 349/139

* cited by examiner

Primary Examiner—Toan Ton
(74) Attorney, Agent, or Firm—Pillsbury Winthrop LLP

(57) ABSTRACT

A method of manufacturing a flat-panel display device including a series of steps for pasting a light-control tape onto a display panel proper, the series of steps for pasting comprising: a step of determining a start position for pasting; a step of taking out the start end of the light-control tape by drawing to peel a release sheet covering a downward-facing adhesive face of the light-control tape; a step of positioning the start end of the light-control tape to the start position; a step of pressing the start end of the light-control tape onto the start position by a rotatable press roller; a step of continuously pasting the light-control tape onto the display panel proper by moving the display panel proper; a step of cutting the light-control tape when pasted by a predetermined length; and a step of completing of pasting a cut piece of the light-control tape.

4 Claims, 9 Drawing Sheets

FIG. 6E (5)
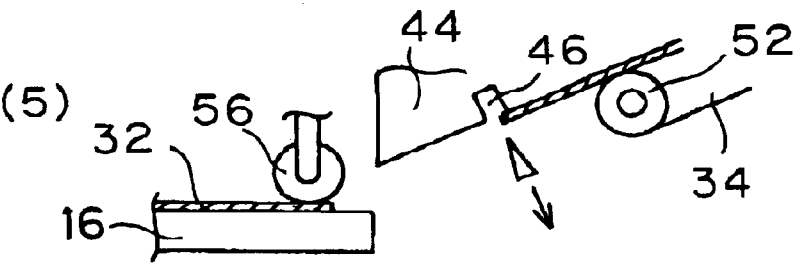
FIG. 6F (6)
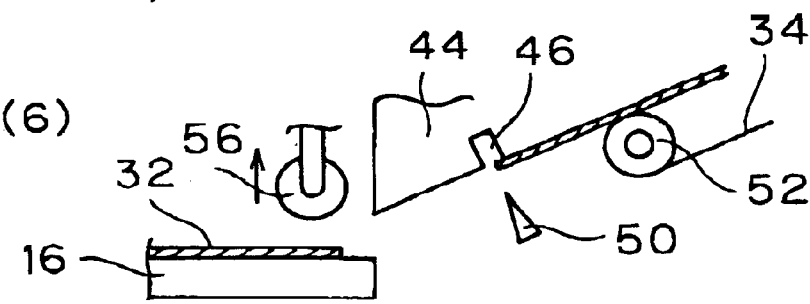
FIG. 6G (7)
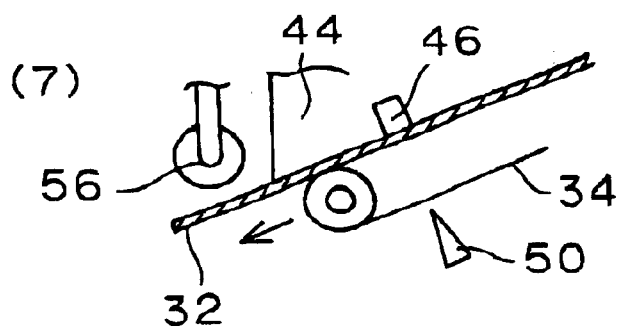
FIG. 6H (8)
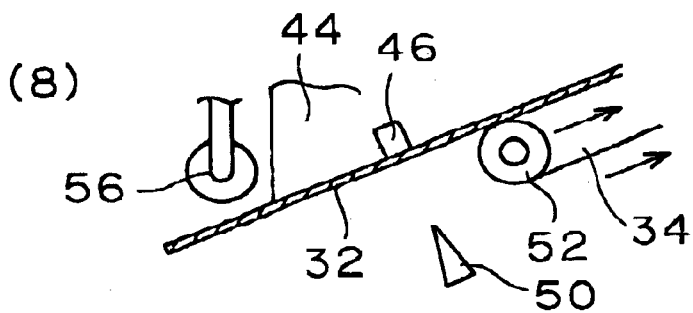

METHOD OF MANUFACTURING FLAT-PANEL DISPLAY DEVICE

BACKGROUND OF THE INVENTION

The present invention relates to a method of manufacturing a flat-panel display device including a process for pasting a light-control tape in an elongated shape, which serves to control light transmittance, onto a display cell (display panel proper), in a flat-panel display device such as a liquid-crystal display device.

A flat-panel display device of a light-transmissive mode, such as a liquid-crystal display device, has a back light on a rear side of the display cell in order to irradiate the display cell. On a rear main face of the display cell, a light-control tape is pasted, in order to prevent light from the back light and the like from leaking through non-displaying area outside the viewing area (a real or effective displaying area) of the display cell to reach a viewer.

Steps of pasting the light-control tape are, for example, as follows.

After carrying out an outer lead bonding (OLB) process for connecting tape carrier packages (TCPs) onto peripheral portion on the display cell, there is carried out a soldering process for soldering the TCPs onto a wiring board. After the soldering process, with the rear main face of the display cell being kept facing upside, an operator manually pastes the light-control tape on the rear main face.

Such manner of pasting the light-control tape poses a problem that accuracy of the pasting varies with the operator and a problem that a complicated operation is required for the operator. Particularly, in respect of the accuracy, length of the light-control tape have to be longer than that of a polarizer stuck on the rear main face of the display cell while the light-control tape have to be prevented from extruding beyond outline of the glass substrate. Further, it is necessary that a gap between the light-control tape and the polarizer is made equal to or smaller than 1 mm. These require a very difficult operation.

Hence, in view of the above-described problems, it is an object of the invention to provide a method of manufacturing a flat-panel display device capable of pasting the light-control tape to the display cell easily and accurately.

BRIEF SUMMARY OF THE INVENTION

According to an aspect of the invention, a method of manufacturing a flat-panel display device includes steps for attaching an elongate light-control tape onto a non-displaying area of a display cell (display panel proper), so as to control (especially, shield or reflect) light transumittance or light incident upon the non-displaying area, said display panel cell being light-transmissive and arranged with a plurality of pixels in a displaying area, said steps for attaching comprising: a step of determining a start position for pasting a start end of the light-control tape on the display cell; a step of taking out the start end of the light-control tape by drawing to peel a release sheet covering a downward-facing adhesive face of the light-control tape, said release sheet being drawn reverseward to a direction of the taking out of the start end; a step of positioning the start end of the light-control tape to the start position; a step of pressing the start end of the light-control tape onto the start position by a rotatable press roller; a step of continuously pasting the light-control tape onto the display cell by moving the display cell in the direction of the taking out of the start end while keeping the light-control tape being pressed by the press roller; a step of cutting the light-control tape when the light-control tape is pasted by a predetermined length; and a step of completing of pasting a cut piece of the light-control tape onto the display cell, by use of the press roller, up to a cut end of the light-control tape.

According to another aspect of the invention, said display cell is of a liquid crystal display and has a polarizer at a main surface thereof; said step of determining a start position further comprising a step of width-wise positioning of the light-control tape in respect of an edge of the polarizer.

According to a still another aspect of the invention, the method further comprises a step of attaching tape carrier packages onto said display cell by compression bonding procedure, before said series of steps for pasting.

According to further aspect of the invention, the method further comprises a step of soldering for connecting the tape carrier packages with a wiring board after said step of attaching onto said display cell, before said series of steps for pasting.

An explanation will be given of a series of steps for pasting the light-control tape in the elongated shape to the display cell, in accordance with invention-wise method of manufacturing the flat-panel display device.

In the first step, the pasting position for pasting the start end of the light-control tape to the display cell is determined or confirmed. In this step, width-wise positioning of the light-control tape is carried out based on an edge of the polarizer, which is already stuck on the display cell.

In the second step, the start end of the light-control tape is taken out by drawing to peel a release sheet covering a downward-facing adhesive face of the light-control tape, said release sheet being drawn reverseward to a direction of the taking out of the start end.

In the third step, the start end of the light-control tape is positioned to the pasting-start position.

In the fourth step, the start end of the light-control tape is pressed onto the pasting-start position by the rotatable press roller.

In the fifth step, the light-control tape is continuously pasted onto the display cell by moving the display cell in the direction of the taking out of the start end while keeping the light-control tape being pressed by the press roller.

In the sixth step, the light-control tape is cut at a predetermined position when the light-control tape is pasted by a predetermined length.

In the seventh step, a cut piece of the light-control tape is further pasted onto the display cell by use of the press roller, up to a cut end of the light-control tape.

By using such a manufacturing method, the light-control tape can be pasted onto the display cell easily and accurately without using manual labor

BRIEF DESCRIPTION OF THE DRAWINGS

FIGS. 6A–6H illustrate explanatory views showing steps of pasting a light-control tape by the pasting apparatus.

DETAILED DESCRIPTION OF THE INVENTION

Figure 1:
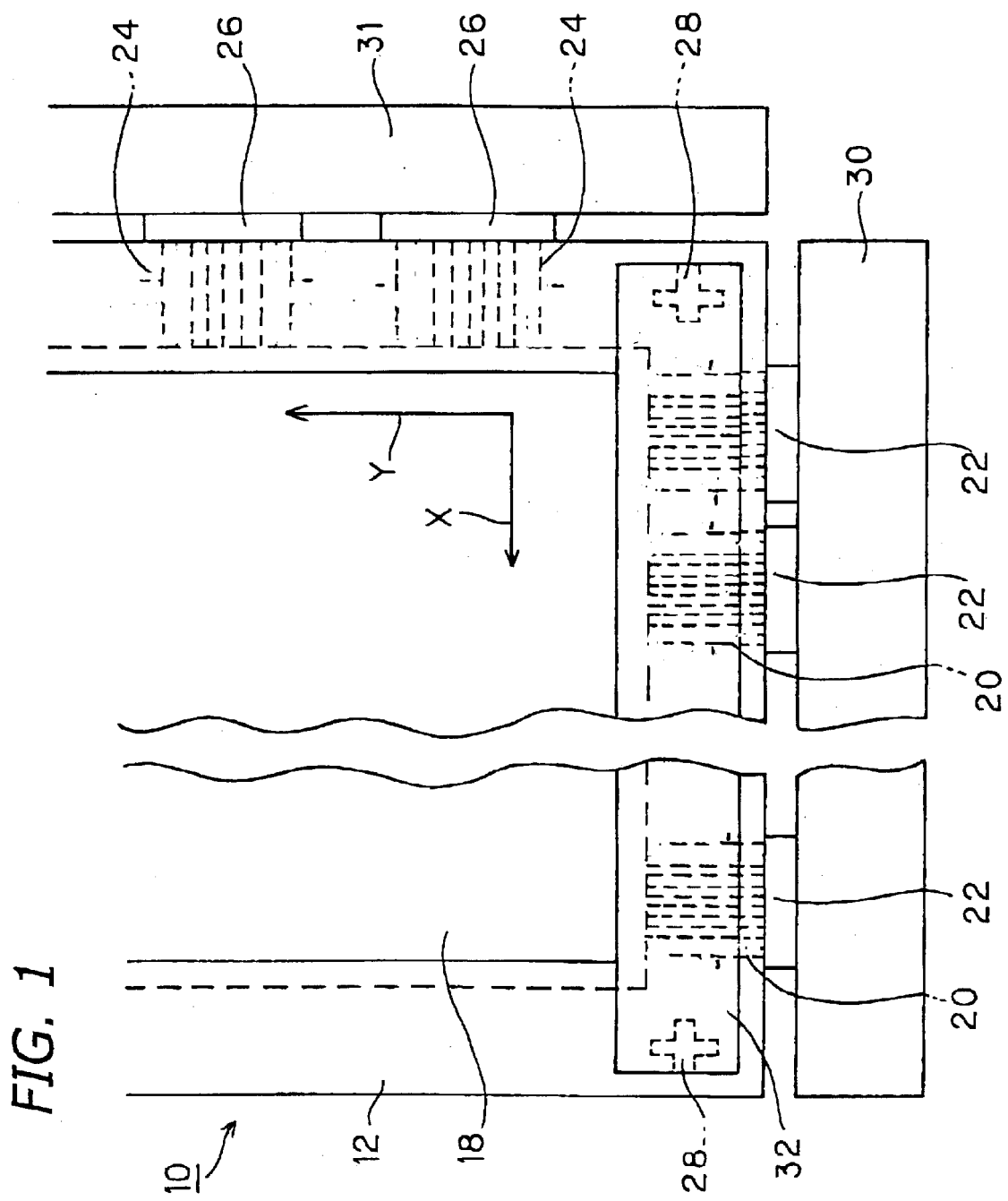
FIG. 1 is a bottom view of a display cell (display panel proper) showing an embodiment of the invention.

An explanation will be given of a method of manufacturing a liquid-crystal display device 10 according to an embodiment of the invention in reference to FIG. 1 through FIG. 9 as follows.

In the embodiment, the liquid-crystal display device is of light-transmissive mode and has; a display panel, which is comprised of a display cell (display panel proper) arranged with a plurality of pixels in a matrix arrangement, and of driver circuits for driving the display cell; and a back light for irradiating the display cell. The driver circuits are formed on TCPs and a wiring board.

The "light-transmissive mode" is meant to encompass not only those in which light for displaying is solely provided by the back light, but those in which light for displaying is provided partly by outside light or front light and partly by the backlight, that is, in a mode of joint use of transmissive and reflective light. Thus, in this specification, the "light-transmissive mode" means a display mode where back light arranged on non-displaying side of the display cell is a main source of light for displaying and where utilization ratio of outside light or front light is rather smaller compared with "light-reflective mode". The outside light means the light incident upon a displaying-side main surface of the display cell, while the "light-reflective mode" means a display mode where back light is not arranged on non-displaying side of the display cell and where light for displaying is provided by the outside light and/or a front light.

Although the back light is meant to irradiates the display area on the display cell, which is arranged with pixels in a matrix arrangement, light from the back light may leak through non-displaying area other than the display area, to viewer's side. Thus, in order to prevent the light leakage, some countermeasures is needed for preventing light transmission at the non-displaying area, on non-displaying side or side of the back light of the display cell. Especially, when the polarizer on displaying-side main face of the display cell is smaller than an opening of a bezel cover and thereby an edge of the polarizer is located within an opening of the bezel cover, it is strongly desired to prevent the light leakage by using a light-control tape. According to the embodiment, the light-control tape is arranged at the non-displaying area on non-displaying-side main face of the display cell to thereby prevent transmission of undesired light from the back light.

Normally, in the liquid-crystal display device, the polarizers are respectively arranged at positions in correspondence with display areas of the display face of the display cell and a face opposed to the display face (face on the side of the back light).

The light-control tape is arranged in tight contact with the polarizer arranged at back-light-side or non-displaying-side main face of the display cell, which is rear main face of the display cell. Width of the light-control tape is set such that light of the back light incident upon a surrounding of the display area is not transmitted to the viewer's side or displaying side. That is, the light-control tape is provided along every edges of the rectangular polarizer on the rear main face of the display cell so as to surround the polarizer. It is preferable that the light-control tape is arranged to completely cover out a surrounding area not covered by the polarizer on the rear main face of the display cell. Thus, It is preferable that the width of the light-control tape is determined respectively at along the edges of the polarizer to constitute a width from an end portion of the polarizer to an end portion of the display cell. Nevertheless, the width of the light-control tape is so designed, in consideration of an accuracy of pasting the polarizer, that the light-control tape does not outwardly protrude from edges of the display cell.

In following, an explanation will be given of a case of pasting the light-control tape along every edges of the display cell. However, the embodiment is not limited thereto but the light-control tape may be provided only along an edge or edges where light leakage has to be prevented, in conformity with designs and requirements of variety of products.

A brief explanation will be given of an outline of a method of manufacturing the liquid-crystal display panel 10 that includes driver circuits, in following two paragraphs.

An array substrate 12 and opposed substrate 14 having an opposed electrode, each of which substrate is comprised of a light-transmissive insulating substrate such as a transparent glass substrate, are bonded together with interposing a layer of liquid crystal material between them; to thereby form a display cell (display panel proper) 16. Subsequently, after cutting out or chamfering the edges of the display cell 16, two polarizers 18 are pasted or stuck respectively onto the displaying-side main surface and the rear or back-light-side main face of the display cell. When the liquid crystal material is of twisted nematic (TN) type for example, the two polarizers 18 are arranged such that their light-transmissive orientation or polarizing axes are orthogonal to each other.

Figure 2:
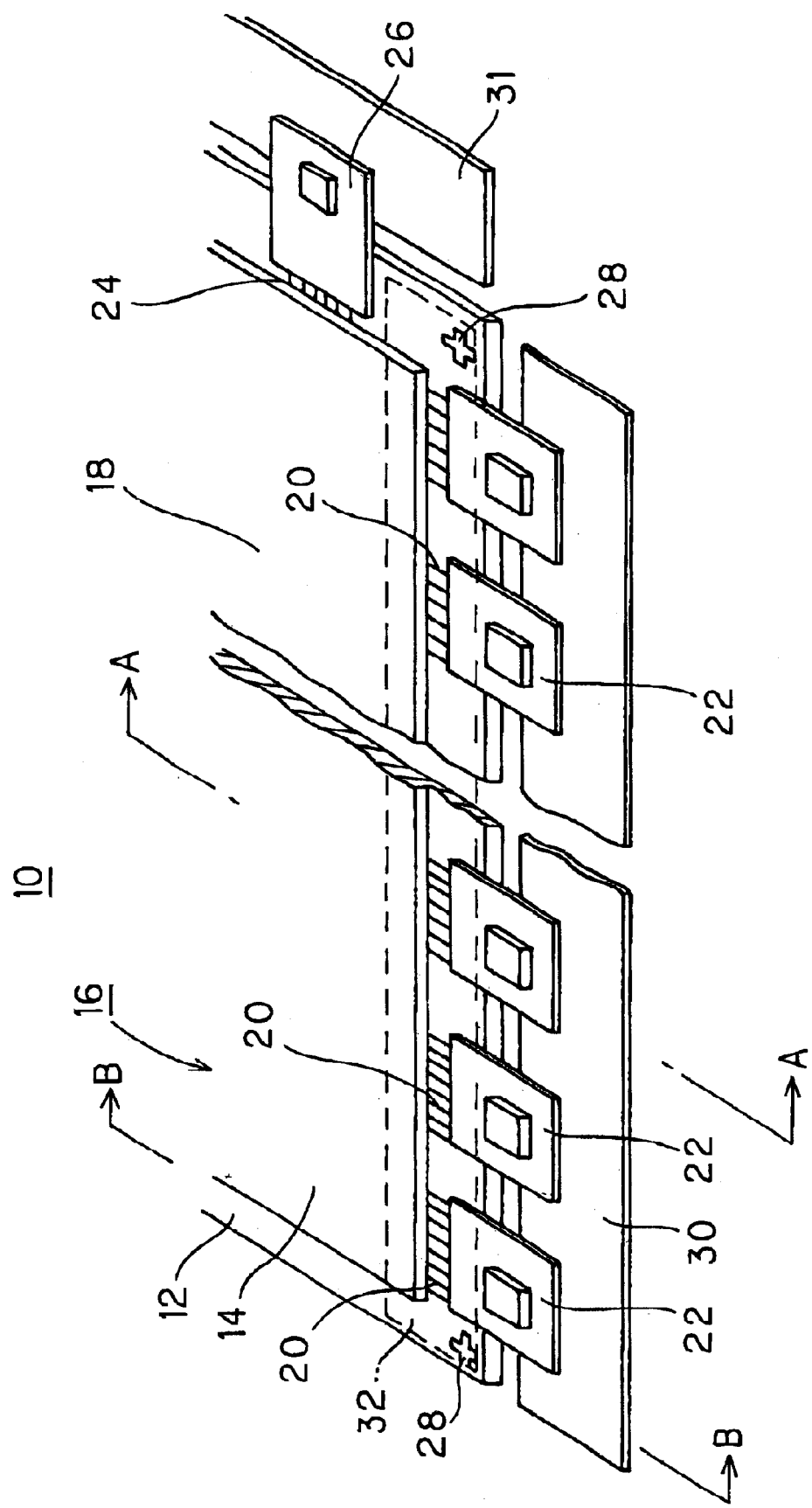
FIG. 2 is a perspective view of the display cell.
Figure 3:
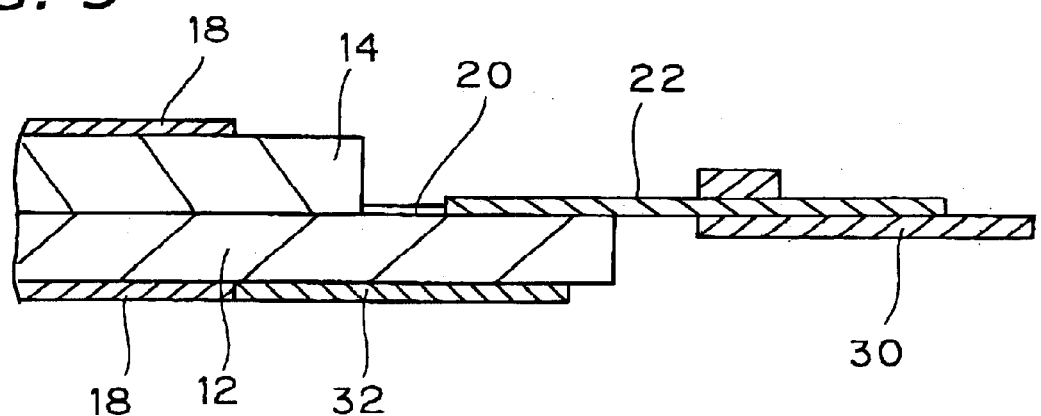
FIG. 3 is a sectional view taken along a line A—A in FIG. 2.
Figure 4:
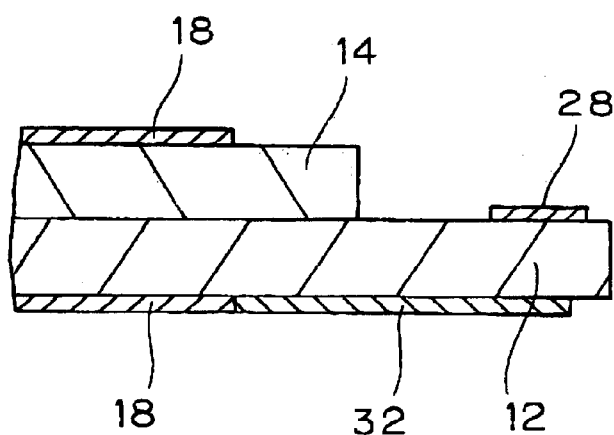
FIG. 4 is a sectional view taken along a line B—B in FIG. 2.

The liquid-crystal display panel 10 is completed by following processes; an outer lead bonding (OLB) process for attaching tape carrier packages (TCPs) onto the display cell 16 assembled as described above (refer to FIG. 7 through FIG. 9); a soldering step for attaching a wiring board onto the TCPs; and a pasting process for pasting the light-control tape (refer to FIG. 1 through FIG. 3).

<Outer Lead Bonding>

An explanation will be given of an outer lead bonding (OLB) process. In this process, a plurality of signal-line TCPs 22 are attached on a longer edge portion of the rectangular display cell 16, on which a connection pads 20 for a plurality of signal lines are arranged, with compression bonding the TCPs 22 onto the connection pads 20 by using an anisotropic conductive film (ACF) 102 interposed between them. Meanwhile, a plurality of scanning-line TCPs 26 are attached on a shorter edge portion of the display cell 16, on which a connection pads 24 for a plurality of scanning lines are arranged, with compression bonding the TCPs 26 onto the connection pads 24 by similarly using an ACF 102.

A detailed explanation will be given of a step of positioning and compression bonding signal-line TCPs 22 in reference to FIG. 7, FIG. 8 and FIG. 9 as follows. A similar step is carried out also for scanning-line TCP 26.

Figure 7:
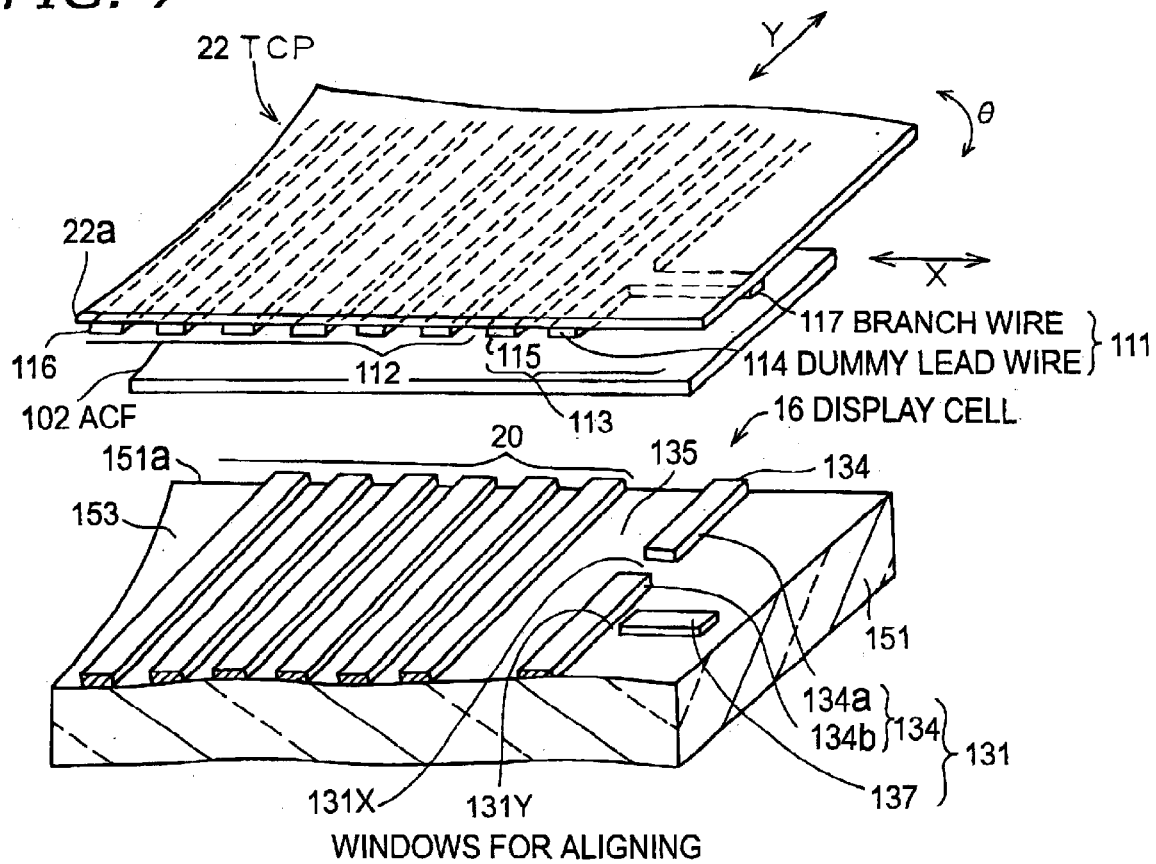
FIG. 7 is an exploded perspective view of essential portions of the display cell.
Figure 7:
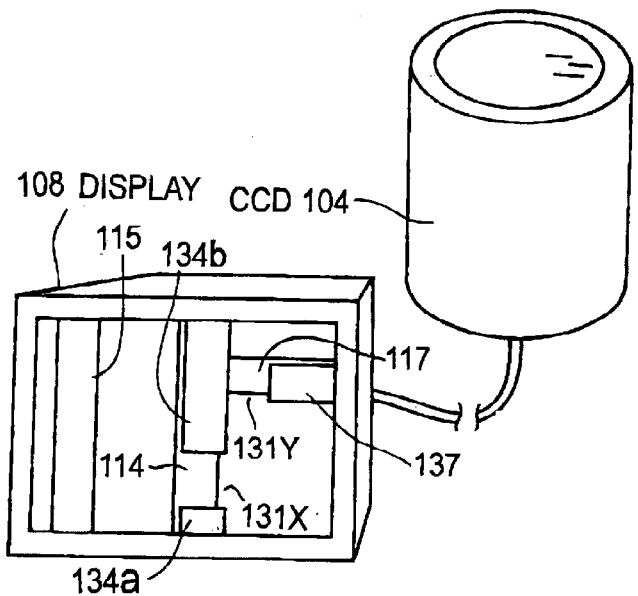

FIG. 7 is an exploded perspective view of essential portions of the liquid-crystal display panel 10; FIG. 8 is a schematic perspective view for explaining how a TCP 22 is positioned in respect of the display cell 16; and FIG. 9 is a vertical sectional view corresponding the FIG. 8.

TCP 22 has a slender driver IC chip 125 on a flexible insulating substrate 110, which IC chip is arranged, for example, in a longitudinal direction of the substrate substantially in a rectangular shape.

The TCP 22 also has an output terminal group 112 for outputting output signals from the driver IC chip 125, on an output-side edge 22a, which is a display-cell-side longer edge of the flexible insulating substrate 110. The output terminal group 112 is comprised of lead wire terminals 116 arranged along the output-side edge 22a. The lead wire terminals 116 are distal ends of a wiring group that is extended from the terminals of the driver IC chip 125 to the output-side edge 22a.

The flexible insulating substrate 110 is formed of a polyimide film, while the output terminal group 112 and the wiring group are formed of a pattern of a copper foil.

It is noted that the output terminal group 112 includes not only connection terminals for supplying signals to a pixel area but also connection terminals for a power source line, a ground line and the like. A terminal arranging pitch of the output terminal group 112 is, for example, equal to or smaller than 0.06 mm.

The TCP 22 also has aligning/inspecting portions 113 comprising dummy terminals, that is, non-electrically-connecting terminals, on both ends of the output terminal group 112. A wiring pattern of the aligning/inspecting portion 113 is used for aligning with a peripheral connecting area 153 on the display cell 16. This wiring pattern is used also for inspecting a compression bonding state of ACF 102. The aligning/inspecting portion 113 is formed of a wiring pattern of copper foil and is formed simultaneously with formation of the output terminal group 112 and the wiring group. The wiring pattern on each aligning/inspecting portion 113 is comprised of: inner and outer dummy lead wires 114, 115, which are arranged substantially in parallel with the respective lead wire terminals 116 of the output terminal group 112; and a branch wire 117. The branch wire 117 is extended orthogonally and outwardly from the outer dummy lead wire 114 and is arranged along the output-side edge 22a.

The branch wire 117 is extended in a direction (hereinafter, referred to as X direction) along an edge 151a of the display cell 16, to which TCPs 22 are mounted. The outer dummy lead wire 114 is extended in Y direction and serves for positioning a TCP 22 in X direction when to mount the TCP 22. That is, the outer dummy lead wire 114 and the branch wire 117 continuous thereto, constitute an aligning mark 111 on the TCP 22.

Meanwhile, the inner dummy lead wire 115 is made to overlap a wire-omitting portion 135 on the display cell 16 and serves for determining or evaluating a state of the anisotropic conductive film (ACF) 102 or a state of the compression bonding, as described later.

As for the display cell 16, the array substrate 12 protrudes like a shelf from an edge 152a of the opposed substrate 14 to form the peripheral connection area 153, on which connection pad groups 20 are arranged and TCPs 22 are mounted. Each connection pad group 20 is for connecting with respective TCP 22. At each of portions 133 sandwiching the connection pad group 20 from pad-arranging direction (X direction), there are provided an aligning mark 131 and the wire-omitting portion 135 respectively in correspondence with the aligning mark 111 and the dummy lead wire 115 on the TCP 22.

The aligning mark 131 comprises a dummy lead wire 134 overlapping the outer dummy lead wire 114 on the TCP 22 and a branch wire 137 overlapping the branch wire 117 on the TCP 22. The aligning mark 131 is formed simultaneously with etching processes for forming TFTs and other patterns on the array substrate 12. There is a disconnected portion at center of the dummy lead wire 134; and the dummy lead wire 134 is separated to an outer portion 134a proximate to the edge 151a of the display cell 16 and an inner portion 134b.

The disconnected portion serves as a window (X-direction aligning window 131X) for observing both edges of the outer dummy lead wire 114 on the TCP 22, from a lower side of the peripheral connection area 153 through the transparent array substrate 12, when the outer dummy lead wire 114 is made to over lap the dummy lead wire 134 on the display cell 16. Through the disconnected portion or X-direction aligning window 131X, positions of both edges of the dummy lead wires can firmly be caught even when center lines of the dummy lead wires 114 and 134 substantially coincide with each other. This is achieved in particular by constituting the width of the dummy lead wire 114 on the side of TCP 22 smaller than the width of the dummy lead wire 134 on the display cell 16.

Further, there is a disconnected portion between a root of the branch wire 137 and the outer edge 134a of the dummy lead wire 134. This disconnected portion constitute a window for positioning in Y direction (Y-direction aligning window 131Y) for catching the branch wire 117 on the TCP 22 overlapped to the branch wire 137 when observed from the lower side of the peripheral connection area 153. The Y-direction aligning window 131Y may be provided at a middle of the branch wire 137, instead of its root portion.

The output terminal group 112 on the TCP 22 is aligned and electrically connected with the connection pad group 20 on the display cell 16, through an ACF 102 in a shape of a tape having substantially a constant width. The TCP 22 and the display cell 16 are also mechanically connected to each other through the ACF 102.

In the above, the lead wires 114 and 134 constituting the aligning marks 111 and 131 on TCP 22 and the display cell 16, are explained as dummy lead wires. However, the lead wires 114 and 134 can also be used for a ground wiring, for a power source line or for inputting a signal to the display cell 16.

Figure 8:
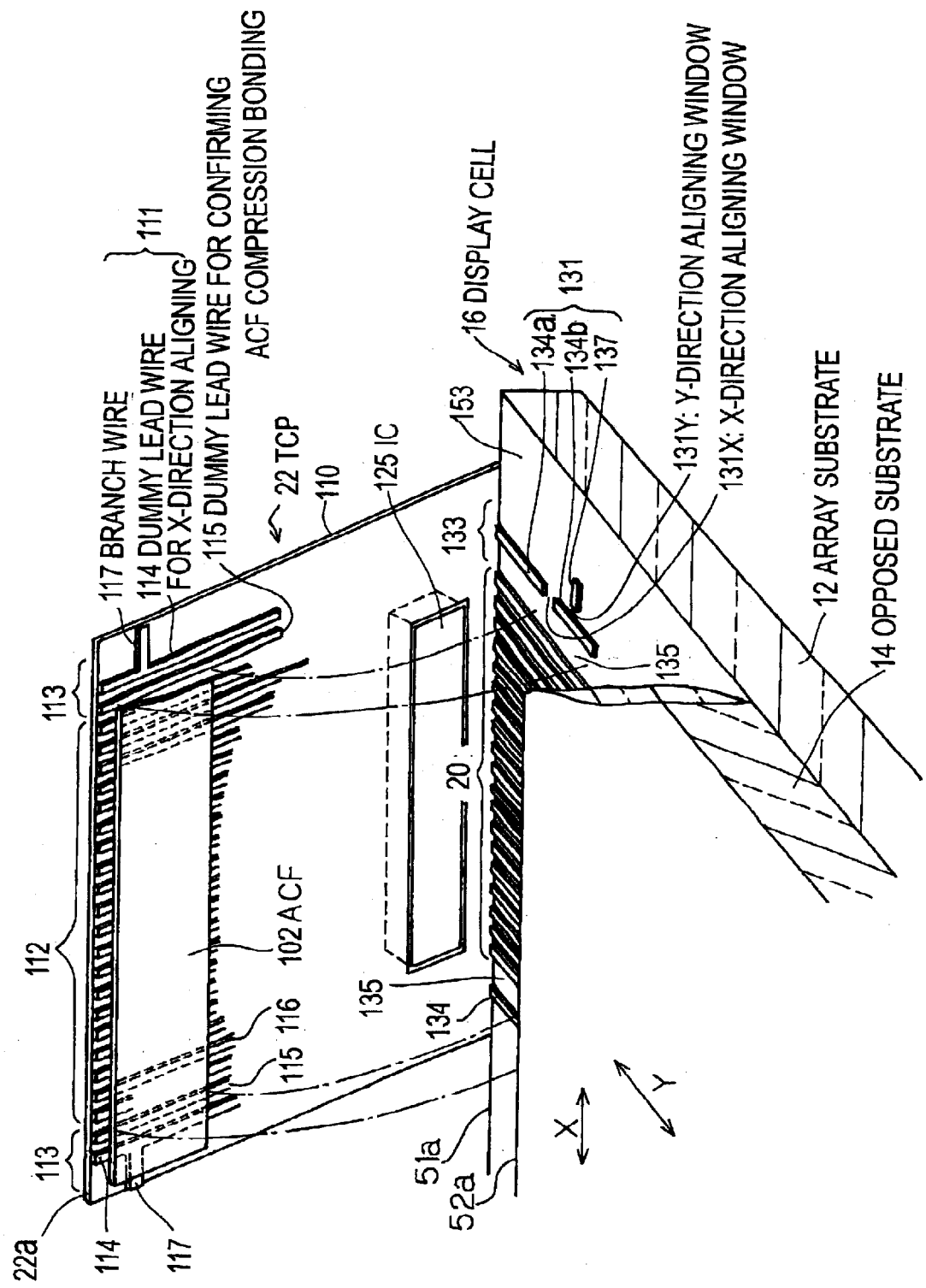
FIG. 8 is a schematic perspective view for explaining how a TCP is positioned in respect of the display cell in an OLB process.
Figure 9:
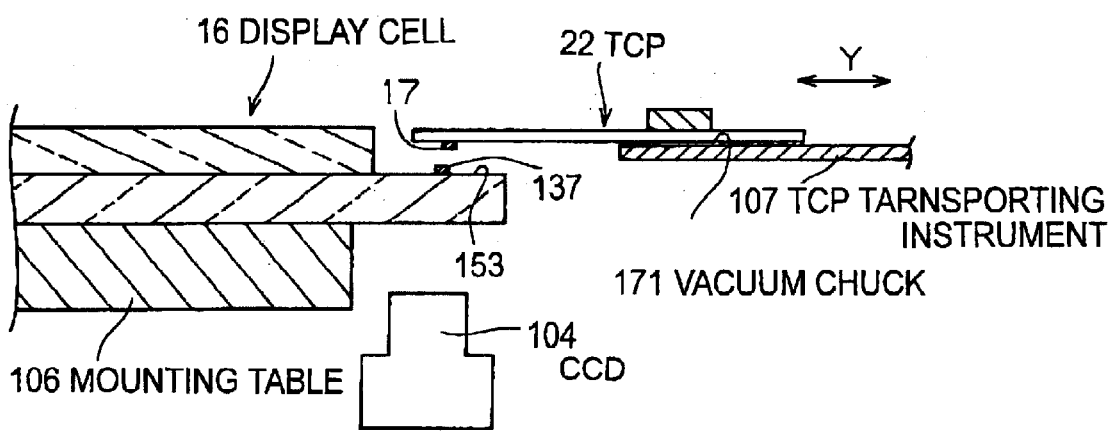
FIG. 9 is a schematic vertical sectional view similarly for explaining how a TCP Is positioned in respect of the display cell.

In following, steps for aligning the output terminal group 112 on the TCP 22 and the connection pads 20 on the display cell 16, by referring FIG. 7 through FIG. 9.

(1) A piece of ACF 102 cut in a predetermined length is pasted to an area of the output terminal group 112 of TCP 22.

(2) TCP 22 is mounted to a TCP transporting instrument 107 having a vacuum chuck 171 and is transported until the output terminal group 112 of TCP 22 reaches a region of the connection pad group 20 on the peripheral connection area 113 (state of FIG. 9). At this occasion, as shown by FIG. 9, the display cell 16 is mounted on a mounting table 106 and is projected from an end edge of the mounting table 106 by an amount of the peripheral connection area 153 like a shelf.

(3) A pair of CCD cameras 104 of an automatic recognizing apparatus are used which are arranged on the lower side of the edge 151a of the array substrate 12. Through the CCD cameras 104, there are caught positions of the outer dummy lead wires 114 and the branch wires 117, which are disposed on both ends of the output terminal group 112 of TCP 22, and positions of the dummy lead wires 134 and branch wires 137 disposed at corresponding portions of the display cell 16. When the dummy lead wires 114 and the branch wires 117 cannot be caught in the CCD cameras, the position of TCP is pertinently adjusted by the TCP transporting instrument 107.

(4) Based on grasping the positions, there is calculated required amount of shifting in position of TCP 22 so as the dummy lead wire 114 and the branch wire 117 on the TCP 22 to superimpose the corresponding dummy lead wire 134 and the corresponding branch wire 137 on the display cell 16. In more detail, there are calculated the required amount of shifting in X direction and Y direction and the required amount of shifting in a rotational direction θ from X direction to Y direction.

(5) Based on the above calculation, there are carried out a required amount of traveling in X direction and Y direction and a required amount of rotation.

(6) By a screen image on a monitor 108 connected with the CCD cameras 104 of the automatic recognizing apparatus, extents of superimposition are evaluated, which includes an extent of superimposing the dummy lead wire 114 on the TCP 22 and the dummy lead wire 134 on the display cell 16; and an extent of super imposing the branch wire 117 and the branch wire 137. In detail, as shown at a lower part of FIG. 7, there are grasped amounts of deviation in X direction and Y direction from correctly superimposed positions, by catching positions of contours of the outer dummy lead wires 114 in an X-direction aligning window 131X, and by catching positions of contours of the branch wires 117 in an Y-direction aligning window 131Y.

For example, firstly, in order to find the amount of deviation in X direction, there is calculated a position of a center line of the dummy lead wire 114 on the TCP 22 from positions of both edges of the dummy lead wire 114 appearing in the window 131 X. Next, there is calculated a center line of the dummy lead wire 134 on the display cell 16 from contours on edges of the dummy lead wires 134a, 134b. Further, there is calculated amount of deviation between the center line of the dummy lead wire 114 and the center line of the dummy lead wire 134, at the center portions of the window 131 X.

An amount of deviation in the rotational direction can also be found by the amounts of deviation in X direction and Y direction.

If the amounts of deviation are equal to or larger than certain values, the position of TCP 22 is adjusted.

(7) When the alignment has been finished in this way, pre-bonding is made and then thermo compression bonding is carried out by a heat tool.

(8) After finishing the thermo compression bonding, there is inspected and confirmed an extent of aligning the TCP 22 and the display cell 16 and an extent or state of a compression bonding of the ACF 102 as follows.

As shown at the lower stage of FIG. 7, there is adjusted the position, etc. of the CCD camera 104 relative to the display cell 16 such that the aligning windows 131X and 131Y in X direction and Y direction and the inner dummy lead wire 115 on the TCP 22 fall in the field of view of the CCD camera 104.

(9) Accuracy of the aligning is evaluated by observing the aligning windows 131X and 131Y in X direction and Y direction similar to the above-described aligning procedure.

(10) By observing the inner dummy lead wire 115 on the TCP 22 overlapping the wire-omitting portion 135 on the display cell 16, there is found 'an extent of crushing' of conductive particles in the ACF 102. That is, there is observed a shape or state of the conductive particles after thermo compression bonding and in particular to what extent the conductive particles are crushed and two-dimensionally spread out along the substrate face.

(11) When there is discovered a failure of positioning or compression bonding of ACF 102 as described above, a portion of bonding TCP 22 and the display cell 16 is peeled off by heating the compression bonding portion. Then, steps for pasting, positioning and compression bonding of ACF 102 are repeated.

In the above explanation, the alignment procedure is carried out by an automatic system using the automatic recognizing apparatus. However, the positioning can be carried out quite similarly even by a manual system.

Further, in the above explanation, a piece of ACF 102 is pasted and thereafter mounted to the terminal face of TCP 22. However, the piece of ACF 102 may be pasted onto the connection pad group 20 on the display cell 16. In this case, the piece of ACF 102 may be used for mounting a plurality of TCPs 22 by arranging the single piece of continuous tape (ACF 102) to cover a plurality of the connection pad groups 20 along an edge of the display cell 16.

In the above explanation, there is used anisotropic conductive film supplied as a tape, the anisotropic conductive film may be formed by coating a paste onto required areas.

According to the embodiment, alignment in mounting a tape carrier package can be carried out reliably and easily; and alignment error due to erroneous recognition of the aligning mark is able to be suppressed.

Further, since the aligning marks on the tape carrier package is constituted by the elongated lead wire and the branch wire continuous thereto, even when the tape carrier package is peeled off in repairing, the aligning marks would not be easily peeled off.

Further the aligning mark and the portion for inspecting the compression bonding state of ACF 102 are arranged proximately to each other; and accordingly, the efficiency of inspecting the tape carrier package after mounting can be promoted.

<Attaching and Connecting of TCPs onto a Wiring Board>

Each of the wiring board is attached and connected with the TCPs by soldering. An explanation will be given of a soldering process.

After mounting TCPs 22 and TCPs 26 on the display cell 16 by compression bonding as described above, each of wiring boards 30 and 31 is respectively soldered to TCPs 22 and TCPs 26.

When aligning a TCP and a wiring board, this wiring board and the array substrate 12 are also aligned. For this reason, there are provided aligning marks 28 at corner portions of surface on the array substrate. The aligning marks 28 are formed simultaneously with etching processes for forming TFTs (thin film transistors) on the array substrate 12. The aligning marks 28 are formed simultaneously also with the aligning marks 131 used for aligning TCPs and the array substrate 12.

For the aligning, a pattern recognition using an image processing is carried out by taking pictures of the aligning marks 28 on the array substrate from the rear main face on the array substrate 12. After the aligning, a wiring board 30 or 31 is soldered to TCPs 22 or TCPs 26.

Common aligning marks may be used as aligning marks 28 for this process and as the aligning marks 131 for aligning TCPs and the array substrate 12.

<Pasting the Light-Control Tape>

In a following manner, light-control tapes 32 are pasted onto the display cell 16.

The light-control tape 32 is pasted, for example, along every edges of the rectangular displaying area, that is real or effective viewing area, on the rear main face of the display cell 16, so as to prevent light of the back light from leaking through non-displaying area outside the displaying area, to viewer's side. In an example illustrated in FIG. 1, the light-control tape 32 is pasted along a longer edge of the rear main face of the display cell 16.

The light-control tape 32 have to be pasted along an edge of a polarizer 18 in a manner not forming a gap between the polarizer 18 and the light-control tape 32, to prevent light from leaking. In the embodiment, the light-control tape 32 reflects light from the back light to thereby prevent undesired light from transmitting to viewer's side. It is noted that side-edge faces of the array substrate 12 are covered with a bezel cover when the display device is assembled; thus, arising no need for the light-control tape 32 on the side-edge faces.

The light-control tape 32 is comprised of; an elongated synthetic resin film such as polyester film of black color; a light shielder formed of aluminum coated on face-side surface of synthetic resin film by vapor deposition; and a coating of adhesive applied on back-side surface of the synthetic resin film. The light shielder reflects light from the back light at its surface of deposited aluminum metal. Meanwhile, the synthetic resin film, in black color or the like, serves to absorb outside light.

Whereas the light shielder is formed of the light-reflecting material in this embodiment, the light shielder may be formed of other light-absorbing material to thereby prevent undesired light from transmitting therethrough.

When the light-control tape 32 is supplied by its provider, a release sheet (an easily peelable sheet) 34 covers the adhesive on its back-side surface, or adhesive face of the light-control tape 32, while the light-control tape 32 is wound around a reel to form a film roll. The width of the light-control tape 32 falls in a range of 1 mm through 4 mm and the width of the light-control tape is determined in accordance with a distance from an edge of the polarizer 18 to a respective edge of the glass substrate, on the rear main face the display cell. Meanwhile, the thickness of the light-control tape is 0.1 mm. The light-control tape is arranged on non-displaying area, which is outside the displaying area, on the array substrate 12 and is arranged along each edges of the array substrate 12 in such a manner that elongated direction of the light-control tape coincides with respective edge of the array substrate 12. Further, width and length of the light-control tape 32 is so set that the light-control tape 32 does not extrude from outline edges of the array substrate 12 and does not overlap the polarizer 18. In the embodiment, the width of the light-control tape 32 is so set that the light-control tape 32 is inwardly distanced by 0.5 mm from designed position of the outline edge of the array substrate, when the light-control tape 32 is arranged in tight contact with an edge of the polarizer 18. Such setting of the width is made so as the light-control tape 32 having a predetermined width not to protrude from the outline edge of the array substrate 12, in consideration of some possible deviation in stuck position of the polarizer 18 for example.

Figure 5:
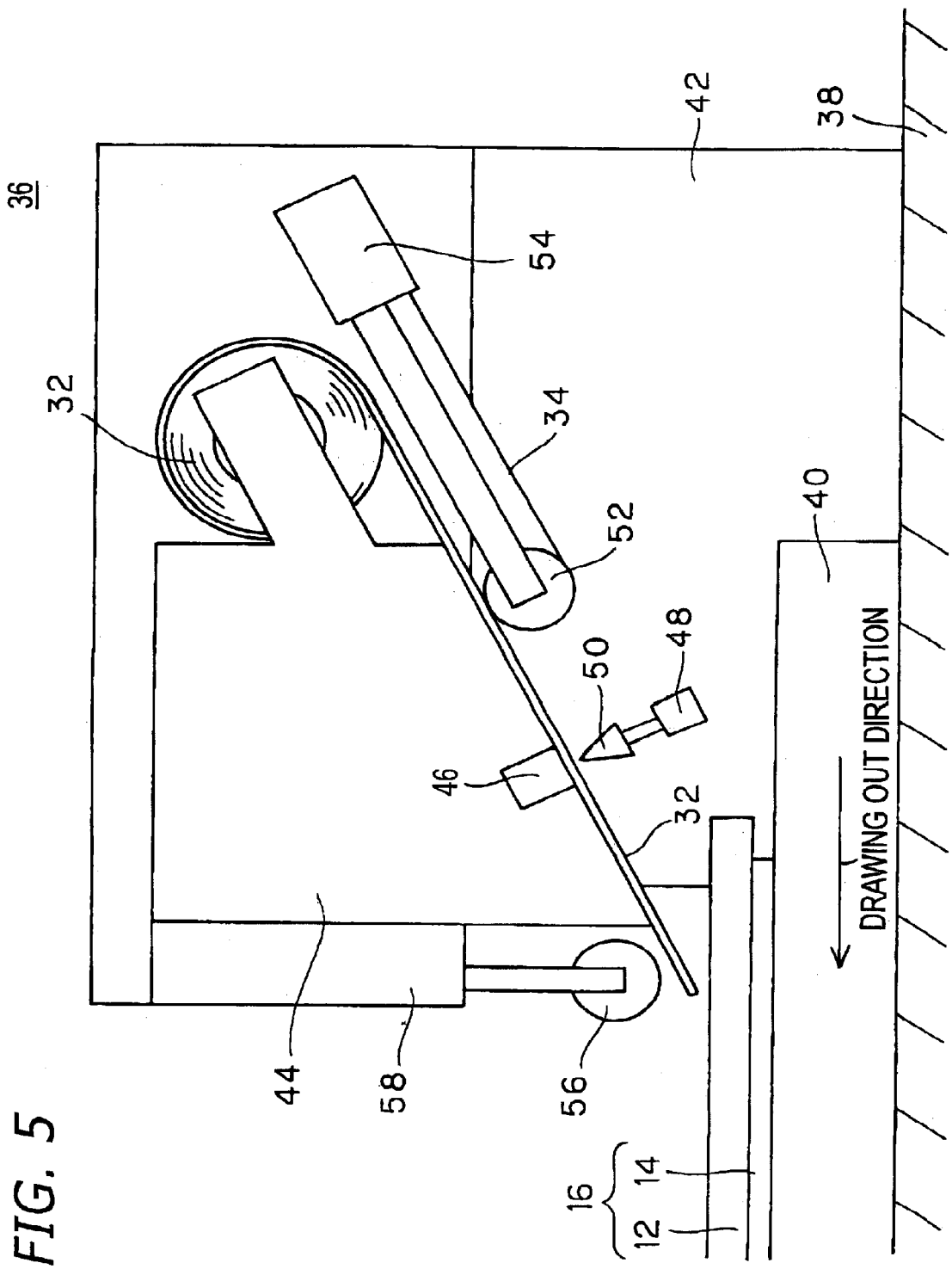
FIG. 5 is a side view of a pasting apparatus.
Figure 6A:
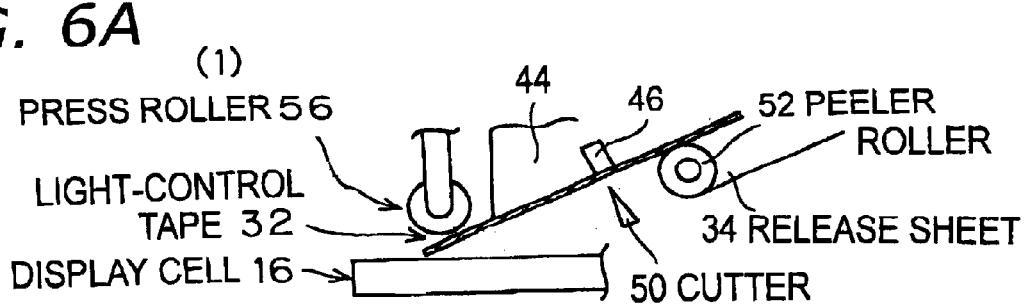
Figure 6B:
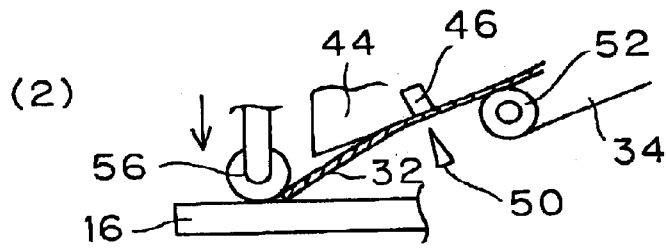
Figure 6C:
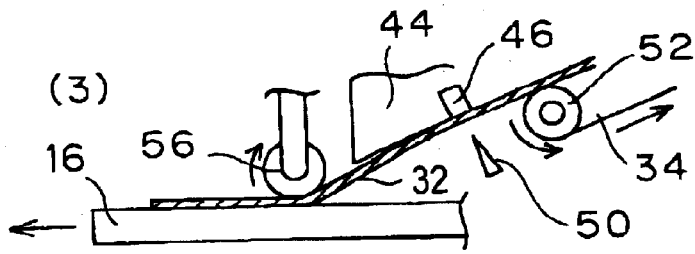
Figure 6D:
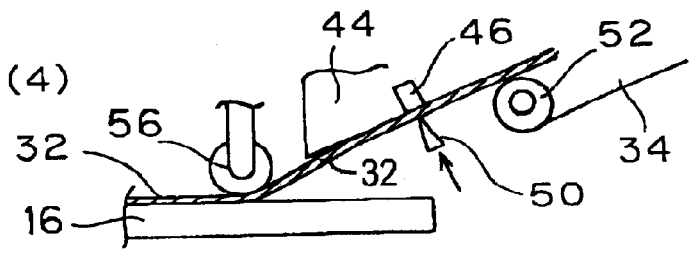

FIG. 5 shows an example of a pasting apparatus for pasting the light-control tape 32 onto the display cell 16, in a schematic side view.

A pasting apparatus 36 is arranged with a movable stage 40 on abase 38 or table movably in one direction (X direction). The display cell 16 is placed on the movable stage 40. Meanwhile, a main body 42 of pasting apparatus 36 is erected on the base 38.

At a top portion of a main body 42, a light-control tape 32 is arranged in a wound film roll; and the light-control tape 32 is drawn from the wound film roll, along a drawing-out body 44 projected from a side portion of the main body 42. A lower face of the drawing-out body 44 is inclined toward the movable stage 40 such that the light-control tape 32 is guided toward the movable stage 40. Meanwhile, in the wound film roll, the adhesive face of the light-disposing 32 tape faces outward; and thus, when drawn, the adhesive face of light-control tape 32 faces downward and toward the display cell 16.

A recess 46 is provided on the lower face of the drawing-out body 44, which is on intermediate portion of a course of drawing out the light-control tape 32; and a cutter 50 of a cutter apparatus 48 is arranged to be insertable into the recess 46. When the cutter apparatus 48 is operated to insert the cutter 50 into the recess 46, the light-control tape 32 is cut, if the light-control tape 32 is being moved along the lower face of the drawing-out body 44.

Beneath the drawing-out body 44, a peeler roller 52 is provided for peeling the release sheet 34 from the light-control tape 32. The peeler roller 52 is driftable in the drawing-out direction of the light-control tape 32, by action of a moving apparatus 54 that is comprised of a motor or an air cylinder.

The peeler roller 52 draws out the light-control tape 32 from the film roll and peels off the release sheet 34 from the light-control tape 32. Details are as follows; by drifting the peeler roller 52 in the drawing-out direction, the light-control tape 32 is drawn out such that a start end of the light-control tape is disposed at beneath a press roller 56; then, there lease sheet is peeled off from the light-control tape 32 by drifting back the peeler roller 52 in a direction reverse to the drawing-out direction.

The press roller 56 is provided at ahead (leftward in the FIG. 5) of the drawing-out body 44 for pressing the light-control tape 32 drawn out along the lower surface of the drawing-out body 44. The press roller 56 is driftable in vertical direction by action of a vertical moving apparatus 58 comprising a motor or air cylinder.

An explanation will be given of steps for pasting the light-control tape onto the display cell 16 by using the pasting apparatus 36 having the above-described constitution in reference to FIG. 6.

<1st step> First, the display cell 16 is placed on the movable stage 40, with the array substrate 12 being upside (that is, the rear main face or back-light side face in completed display device is upside). Then, there is detected a pasting-start position for pasting a start end of the light-control tape 32 that is drawn out from the lower face of the drawing-out body 44 by a predetermined length. In order that the start end of the light-control tape 32 is positioned in X direction (that is, in the drawing out direction of the light-control tape 32), the movable stage 40 and the display cell 16 are fixed to predetermined positions while position of the drawing-out body 44 is numerically controlled and fixed. Meanwhile, with regard to the width direction of the light-control tape 32, that is, Y-axis direction, a position of an edge of the polarizer 18 is detected and determined. Specifically, the surface of the display cell 16 mounted on the movable stage 40 is scanned by a stepped portion-detecting sensor; detected stepped portions at around presumable position of the edge of the polarizer 18 is taken as position of the edge of the polarizer; and one edge of the light-control tape 32 is brought at the detected edge of the polarizer 18.

As described above, the start end of the light-control tape 32 is positioned to the pasting-start position.

<2nd step> After positioning the start end of the light-control tape 32 to the pasting-start position, the press roller 56 is brought downward so that the adhesive face of the light-control tape 32 sticks onto the pasting-start position of the display cell 16.

<3rd step> The movable stage 40 is drifted in the drawing out direction (X direction) of the light-control tape 32 while the light-control tape 32 being pressed by the press roller 56. In this way, the light-control tape 32 is continuously pasted onto the rear main face of the display cell 16 along its edge. In same time, the release sheet is successively peeled off by the peeler roller 52.

<4th step> When a predetermined length of the light-control tape 32 is drawn out from the film roll under numerical control, the light-control tape 32 is cut by the cutter 50 while being pressed by the press roller 56.

In this way, the light-control tape is pasted without touching the adhesive face of the light-control tape 32, since the light-control tape is cut while pasting of the light-control tape, by the predetermined length. When a pre-cut piece of the light-disposing in the predetermined length is used, it goes in other manner. Further, because pressing of whole of the light-control tape is feasible, automation of pasting the light-control tape is easily achieved.

When the predetermined length of the light-control tape has to be varied in accordance with variety of display device products, setting of the pasting apparatus is easily changeable by numerical control. Thus, change of the setting is much easier than a process using the pre-cut light-control tape in the predetermined length.

<5th step> The cut piece of the light-control tape 32 is further pasted onto the display cell 16 by the press roller 56 up to a cut end of the piece of the light-control tape 32.

Because whole of the cut piece of the light-control tape 32 is successively pressed and pasted by the press roller 56 up to the cut end, accuracy of the pasting is excellent without causing touching on the adhesive face of the light-control tape 32.

<6th step> After pressing the light-control tape 32 by the press roller 56 up to the cut end, the press roller 56 is moved upward. By the time of the movement, the cut piece of the light-control tape 32 has already been pasted in a manner as shown by FIG. 1 through FIG. 3.

<7th step> Since the start end of the cut light-control tape 32 is disposed at the recess 46 on the drawing-out body 44, the peeler roller 52 is moved in the drawing out direction and along therewith, the start end of the light-control tape 32 is taken to beneath the press roller 56. After this, as mentioned above, the pasting-start position is determined; and then the start end of the light-control tape 32 is disposed at the pasting-start position.

<8th step> The release sheet 34 is peeled off from the light-control tape 32 by moving the peeler roller 52 in the direction reverse to the drawing out direction.

Then, operation of the pasting apparatus 36 returns to the 1st step and successively, the light-control tape 32 is pasted to a next one of the display cell 16.

As mentioned above, by using the pasting apparatus 36, the light-control tape 32 is pasted accurately and easily along the edge of the polarizer 18.

Because the light-control tape is drawn out from the film roll while pasting, and because the light-control tape is cut by the predetermined length while pasting of the light-control tape, automation of the pasting process is easily feasible without causing touching on the adhesive face of the light-control tape.

Further, after cutting the light-control tape by the predetermined length, the cut piece of the light-control tape is further pasted up to the cut end. Accordingly, because the total of the light-control tape is pressed on by the press roller, accuracy of the pasting is achieved.

Further, because the light-control tape is pasted after the OLB step and soldering step, accurate alignments between the array substrate and TCP and between TCP and the wiring board are achievable, by using alignment marks for the OLB process arranged at the peripheral connection area and by using alignment marks for the soldering step.

The above construction, in which the light-control tape is arranged on the rear main face of the display cell, is applicable generally to a flat-panel display device of the "light-transmissive mode".

<Industrial Applicability>

As mentioned above, according to the method of manufacturing the flat-panel display device of the invention, the light-control tape can be pasted to the display cell easily and accurately without manual labor of an operator.

The entire disclosure of Japanese Patent Application No.2000-143549 filed on May 16, 2000 and of Japanese Patent Application No. 2000-137368 filed on May 10, 2000 including specification, claims, drawings and summary are incorporated herein by reference in its entirely.

What is claimed is:

1. A method of manufacturing a flat-panel display device including steps of attaching a light-control tape onto a non-displaying-side main face of a light-trasmissive display cell along edge-wise direction of the display cell, said display cell being light-trasmissive and arranged with a plurality of pixels in a matrix arrangement at a displaying area on a displaying-side main face thereof, said steps of attaching comprising:
    a step of placing the display cell on a movable stage;
    a step of positioning a start end of the light-control tape to a pasting-start position of a to-be pasted area, on the display cell, for pasting the light-control tape;
    a step of pressing the start end of the light-control tape onto the pasting-start position by a press roller rotatable along one direction; and
    a step of continuously pasting the light-control tape onto the to-be pasted area by moving the movable stage along a rotating direction of the press roller;
    said step of continuously pasting being comprised of a step of cutting the light-control tape, while moving the movable stage, by a length substantially tantamount to the to-be pasted area.

2. The method of manufacturing a flat-panel display device according to a claim 1,
    said movable stage being moved until said press roller passes through a cut end of the light-control tape.

3. The method of manufacturing a flat-panel display device according to claim 1,
    wherein, while said display cell has polarizers at main surfaces thereof, said step of positioning the start end of the light-control tape is made in respect of an edge of the polarizer.

4. The method of manufacturing a flat-panel display device according to claim 2,
    said light-control tape being pasted onto the to-be pasted area such that an edge of the polarizer and a longitudinal edge of the light-control tape are brought into tight contact with each other.

* * * * *